(12) United States Patent
Peet et al.

(10) Patent No.: US 10,508,435 B2
(45) Date of Patent: Dec. 17, 2019

(54) BUILDING ASSEMBLY INCLUDING A WEATHER RESISTANT BARRIER, A SHEET FOR USE AS A WEATHER RESISTANT BARRIER, A LIQUID COATING COMPOSITION AND METHODS OF MAKING THE FOREGOING

(71) Applicant: CERTAINTEED CORPORATION, Malvern, PA (US)

(72) Inventors: Jeffrey H. Peet, Southborough, MA (US); Bertrand Heurtefeu, Tremblay-en-France (FR); Nicole Love, Somerville, MA (US); Antoine Diguet, Paris (FR)

(73) Assignee: CERTAINTEED CORPORATION, Malvern, PA (US)

( * ) Notice: Subject to any disclaimer, the term of this patent is extended or adjusted under 35 U.S.C. 154(b) by 0 days.

(21) Appl. No.: 16/196,849

(22) Filed: Nov. 20, 2018

(65) Prior Publication Data
US 2019/0085553 A1    Mar. 21, 2019

Related U.S. Application Data

(63) Continuation of application No. 15/392,716, filed on Dec. 28, 2016, now Pat. No. 10,167,627.

(60) Provisional application No. 62/273,639, filed on Dec. 31, 2015.

(51) Int. Cl.
| | |
|---|---|
| *E04B 1/62* | (2006.01) |
| *B05D 1/18* | (2006.01) |
| *C09D 133/08* | (2006.01) |
| *E04B 2/00* | (2006.01) |
| *C09D 109/00* | (2006.01) |
| *C09D 109/06* | (2006.01) |
| *B05D 1/02* | (2006.01) |
| *B05D 1/28* | (2006.01) |
| *E04C 2/04* | (2006.01) |
| *E04C 2/52* | (2006.01) |
| *C09D 133/26* | (2006.01) |
| *C09D 109/02* | (2006.01) |

(52) U.S. Cl.
CPC ............... *E04B 1/625* (2013.01); *B05D 1/02* (2013.01); *B05D 1/18* (2013.01); *B05D 1/28* (2013.01); *C09D 109/00* (2013.01); *C09D 109/02* (2013.01); *C09D 109/06* (2013.01); *C09D 133/08* (2013.01); *C09D 133/26* (2013.01); *E04C 2/043* (2013.01); *E04C 2/44* (2013.01); *E04C 2/528* (2013.01)

(58) Field of Classification Search
CPC ..... E04B 1/625; C09D 109/00; C09D 109/06; C09D 133/08; B05D 1/02; B05D 1/18; B05D 1/28
See application file for complete search history.

(56) References Cited

U.S. PATENT DOCUMENTS

| | | |
|---|---|---|
| 5,430,104 A | 7/1995 | Siol et al. |
| 6,495,163 B1 | 12/2002 | Jordan |
| 6,686,046 B2 | 2/2004 | Schauer et al. |
| 7,662,221 B2 | 2/2010 | Fay |
| 8,088,478 B2 | 1/2012 | Fish et al. |
| 10,167,627 B2 | 1/2019 | Peet et al. |
| 2006/0091228 A1* | 5/2006 | Hsu ............... B01D 53/261 236/44 C |
| 2006/0128241 A1* | 6/2006 | Tseng ............ A41D 31/0038 442/85 |
| 2007/0294976 A1 | 12/2007 | Fay |
| 2009/0107080 A1 | 4/2009 | Bowe et al. |
| 2009/0139181 A1 | 6/2009 | Bowe et al. |
| 2010/0042062 A1 | 2/2010 | Fernkvist et al. |
| 2012/0237575 A1 | 9/2012 | Yoshii et al. |
| 2012/0264655 A1 | 10/2012 | Fitch et al. |

(Continued)

FOREIGN PATENT DOCUMENTS

| | | |
|---|---|---|
| JP | 2009-270397 A | 11/2009 |
| WO | 2012140059 A1 | 10/2012 |
| WO | 2012140064 A1 | 10/2012 |

(Continued)

OTHER PUBLICATIONS

Chen, et al. "Effects of Temperature and Humidity on the Barrier Properties of Biaxially-oriented Polypropylene and Polyvinyl Alcohol Films", Journal of Applied Packaging Research, vol. 6 Issue 1, p. 40-46, May 16, 2014. (Year: 2014).*

Almeida et al., "Temperature and pH stimuli-responsive polymers and their applications in controlled and self-regulated drug delivery," Journal of Applied Pharmaceutical Science, 2012, pp. 1-10, vol. 2, Iss. 6.

Aseyev et al., "Non-ionic Thermoresponsive Polymers in Water," Adv Polym Sci, 2010, pp. 29-89, vol. 242.

(Continued)

*Primary Examiner* — Christopher M Rodd
(74) *Attorney, Agent, or Firm* — Abel Schillinger, LLP; Thomas H. Osborn

(57) ABSTRACT

A weather resistive barrier (WRB) for the exterior protection of building substrates can have a water vapor permeability that decreases with increasing temperature. In an embodiment, the WRB includes a coating comprising a LCST polymer, and may further include a second polymer. The WRB can be part of a building assembly, part of a sheet, or a sheet itself, the sheet having an air permeability of less than 0.02 L/(s m$^2$) at a pressure of 75 Pa. Furthermore a liquid coating composition can include a LCST polymer and a second polymer, wherein the liquid coating composition can be adapted that a solid coating formed by the liquid coating composition has an air permeability of less than 0.02 L/(s m$^2$) at a pressure of 75 Pa and a water vapor permeability that decreases with increasing temperature.

24 Claims, 5 Drawing Sheets

(56) References Cited

U.S. PATENT DOCUMENTS

2015/0176211 A1 6/2015 Knapp
2017/0191255 A1 7/2017 Peet et al.

FOREIGN PATENT DOCUMENTS

WO 2015095786 A1 6/2015
WO 2017117244 A1 7/2017

OTHER PUBLICATIONS

ASTM E 96 / E 96 M Standard Test Methods for Water Vapor Transmission of Materials, 2016, pp. 1-14, ASTM International.
Butt, Thomas K., "Water Resistance and Vapor Permeance of Weather Resistive Barriers," Journal of ASTM International, 2005, pp. 1-15, vol. 2, No. 10.
Chhabra et al., "Humidity Effects on the Wetting Characteristics of Poly(N-isopropylacrylamide) during a Lower Critical Solution Transition," Langmuir, 2013, pp. 8116-8124, vol. 29, American Chemical Society.
Thomson Innovation Patent Export, Record DE102010018810A1, 1 page. (Flaig et al.).
Gibson, Phillip W., "Effect of temperature on water vapor transport through polymer membrane laminates," Polymer Testing, 2000, pp. 673-691, vol. 19, Elsevier.
Gil et al., "Stimuli-responsive polymers and their bioconjugates," Progress in Polymer Science, 2004, pp. 1173-1222, vol. 29.
Jablonka et al., "Selection Tool for Water-Resistive Barriers with Suitable Vapor Permeability," Thermal Performance of the Exterior Envelopes of Whole Buildings XII International Conference, 2013, pp. 1-11, ASHRAE.
Künzel, Hartwig M., "Flexible Vapor Control Solves Moisture Problems of Building Assemblies—Smart Retarder to Replace the Conventional PE-Film," J. Thermal Env. & Bldg. Sci., 1999, pp. 95-102, vol. 23.
Qiu et al.; "'Smart' Materials Based on Cellulose: A Review of the Preparations, Properties, and Applications," Materials, 2013, pp. 738-781, vol. 6.
Straube et al., "Ventilated Wall Claddings: Review, Field Performance, and Hygrothermal Modeling," building science.com, 2009, 25 pgs.
Kuckling et al., "Synthetic and Physicochemical Aspects of Advanced Stimuli-Responsive Polymers," Handbook of Stimuli-Responsive Materials, 2011, 26 pgs.
International Search Report and Written Opinion for PCT/US2016/068920, dated Apr. 11, 2017, 14 pages.
Chen et al., "Effects of Temperature and Humidity on the Barrier Properties of Biaxially-oriented Polypropylene and Polyvinyl Alcohol Films," Journal of Applied Packaging Research, 2014, pp. 40-46, vol. 6, Iss. 1.

\* cited by examiner

BUILDING ASSEMBLY INCLUDING A WEATHER RESISTANT BARRIER, A SHEET FOR USE AS A WEATHER RESISTANT BARRIER, A LIQUID COATING COMPOSITION AND METHODS OF MAKING THE FOREGOING

CROSS-REFERENCE TO RELATED APPLICATION(S)

This application claims priority under 35 U.S.C. § 120 to and is a continuation of U.S. application Ser. No. 15/392,716, entitled "BUILDING ASSEMBLY INCLUDING A WEATHER RESISTANT BARRIER, A SHEET FOR USE AS A WEATHER RESISTANT BARRIER, A LIQUID COATING COMPOSITION AND METHODS OF MAKING THE FOREGOING," by Jeffrey H. PEET et al., filed Dec. 28, 2016, which in turn claims priority under 35 U.S.C. § 119(e) to U.S. Provisional Patent Application No. 62/273,639, entitled "BUILDING ASSEMBLY INCLUDING A WEATHER RESISTANT BARRIER, A SHEET FOR USE AS A WEATHER RESISTANT BARRIER, A LIQUID COATING COMPOSITION AND METHODS OF MAKING THE FOREGOING," by Jeffrey H. PEET et al., filed Dec. 31, 2015, of which all applications are assigned to the current assignee hereof and incorporated herein by reference in their entireties.

FIELD OF THE DISCLOSURE

The present disclosure relates to a weather resistive barrier (WRB) for building assemblies, sheets for use as weather resistant barriers, liquid coating compositions and methods of making the foregoing.

BACKGROUND

For the construction of wall assemblies, the moisture levels within the wall cavity can be controlled to avoid the formation of mold, which can lead to structural damage and health consequences. An interior smart vapor barrier can be placed on the inner side of an exterior wall cavity to control moisture vapor transmission between the air in the house and the air in the wall cavity. This type of vapor barrier is often called a smart barrier, because it has an increased moisture vapor permeability with increased humidity: during the winter and heating season, when the relative humidity within the wall cavity is low, the interior barrier can maintain the low moisture levels within the wall cavity, while during summer, in the cooling season, when the relative humidity within the wall cavity is high, the smart barrier allows the moisture to escape into the house.

The above-described interior barrier layer is however not suitable as an exterior barrier layer facing the outdoor environment, because different moisture and temperature conditions apply on the exterior surface of a wall. There is a need for further improving exterior weather resistant barriers.

SUMMARY

According to one embodiment, a building assembly comprising a building substrate and a WRB, the WRB having a water vapor permeability that decreases with increasing temperature in a temperature range from 5° C. to 60° C. at a 75% relative humidity (RH).

According to another embodiment, a sheet for use as a WRB comprising a coating, wherein the coating comprises a LCST polymer and a second polymer; the sheet has an air permeability of less than 0.02 L/(s m$^2$) at a pressure of 75 Pa; and a water vapor permeability of the sheet decreases with increasing temperature in a temperature range from 5° C. to 60° C. at 75% RH.

According to a further embodiment, a liquid coating composition comprising a LCST polymer and a second polymer, wherein the liquid coating composition is adapted that a solid coating formed by the liquid coating composition has an air permeability of less than 0.02 L/(s m$^2$) at a pressure of 75 Pa; and a water vapor permeability of the solid coating decreases with increasing temperature in a temperature range from 5° C. to 60° C. at 75% RH.

BRIEF DESCRIPTION OF THE DRAWINGS

The present disclosure may be better understood, and its numerous features and advantages made apparent to those skilled in the art by referencing to the accompanying drawings.

DETAILED DESCRIPTION

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Various embodiments of the present disclosure will now be described, by way of example only, with reference to the accompanying drawings.

The present disclosure relates to a WRB that can be applied in form of a coating on a building substrate for exterior weather protection and can regulate water vapor permeation such that the water vapor permeability decreases with increasing temperature.

In embodiments, the coating of the WRB can include a lower critical solution (LCST) polymer and may further include a second polymer. As used herein, the terms "a LCST polymer" and "a second polymer" means both, the singular form and the plural form, such as one or more LCST polymers and one or more second polymers.

As used herein, the term LCST polymer is intended to mean a thermoresponsive polymer which can undergo a change of its three-dimensional structure at a certain temperature, also called the LCST. In the present specification, the terms LCST polymer and thermoresponsive polymer are used interchangeable.

Figure 1:
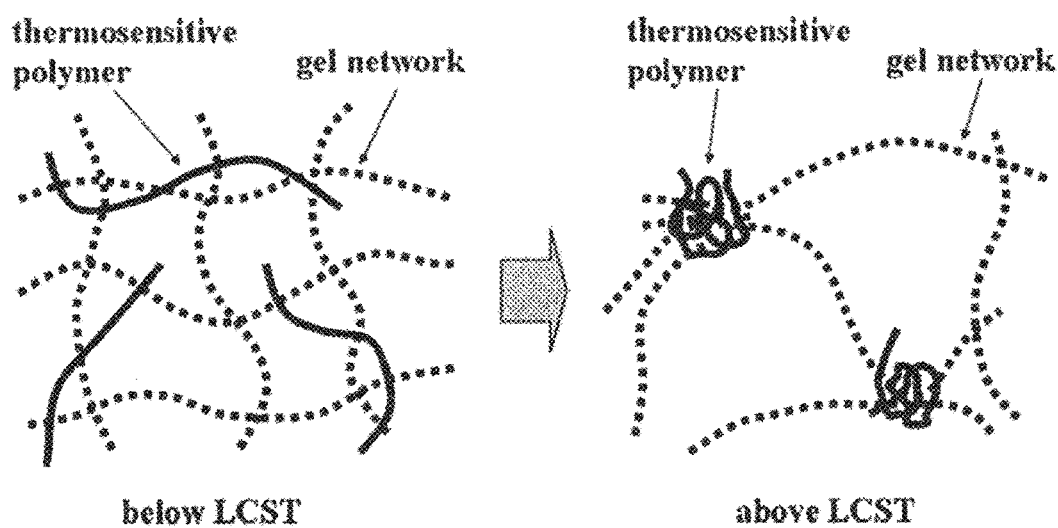
FIG. 1 includes an illustration of a temperature dependent conformational change of a LCST polymer below LCST and above LCST.
Figure 2:
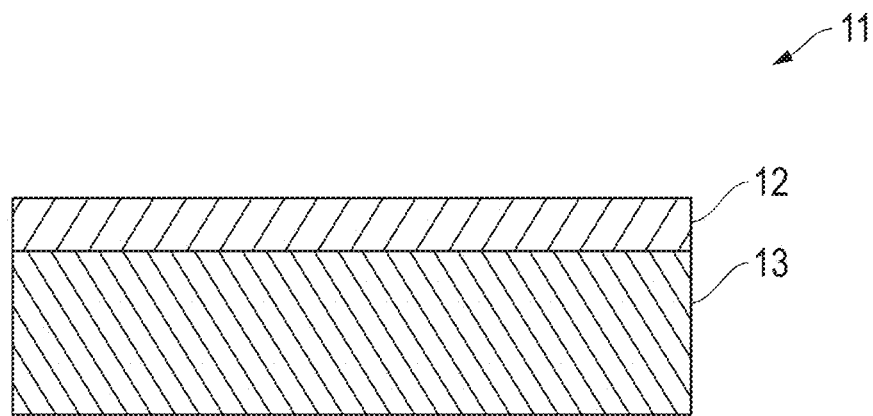
FIG. 2 includes an illustration of a WRB in form of a one-layer coating applied on a building substrate according to one embodiment.

LCST behavior of thermoresponsive polymers can be observed in solution: below the LCST, a thermoresponsive polymer is fully miscible in a solution, but at a certain temperature (the LCST) the polymer begins to collapse and becomes insoluble. Polymers which are known to have LCST behavior in solution are not well investigated in the solid phase with regard to this thermoresponsive property. Not being bound to theory, it is speculated that a conformational change of the LCST polymer distributed within a solid matrix, such as a solid coating, can be associated with changes of the porous structure and the hydrophilic character of the solid matrix and thereby can cause a change in water vapor permeability. As demonstrated in FIG. 1, it is assumed that a LCST polymer distributed within a polymeric matrix undergoes a conformational change at its LCST, such that above the LCST, a more dense structure is formed which causes a decrease in water vapor permeability compared to a water vapor permeability at a temperature below the LCST.

As used herein, all water vapor permeability values have the unit US perm, wherein 1 US perm converts to 0.659045 metric perms (m.p.).

As used herein, the term coating is intended to mean a single coating layer or a multi-layer coating that has been applied to a substrate with a liquid coating composition after drying. In embodiments, the term coating may also relate to a thin sheet or film, for example, an extruded film comprising the LCST polymer distributed within a polymeric matrix.

As used herein, the term polymeric matrix is intended to mean a polymeric network formed by a second polymer different from the LCST polymer. The LCST polymer can be distributed within the polymeric matrix of the second polymer. In the present disclosure, the term polymeric matrix is interchangeable used with the term "second polymer" or "matrix polymer."

In one embodiment, the LCST polymer can be mixed with the second polymer without forming a chemical bonding. In particular embodiments, each of the LSCT polymer and the second polymer may be a homopolymer, part of a copolymer or could be a combination of polymers. In another embodiment, the LCST polymer can by grafted via chemical bondings on the second polymer of the polymeric matrix.

In embodiments, the LCST polymer contained in the WRB coating of the present disclosure can be a hydroxyalkyl cellulose, a poly(alkylacrylamide), a poly(vinyl methyl ether), a polyetheramine, a polyether; an alkylgycidylether; a polyphosphester; or any combination thereof.

In particular embodiments, the LCST polymer of the WRB coating of the present disclosure can include hydroxypropylcellulose, poly(N-isopropylacrylamide), poly(N-(tert-butyl)acrylamide), a monoamine of a poly(ethylene propylene) copolymer (for example, Jeffamine M-2005™-brand polymer available from Huntsman Corporation, The Woodlands, Tex., USA), or any combination thereof.

Other non-limiting examples of LCST-polymers that may be suitable for the WRB coating of the present disclosure can be N-substituted poly(acrylamide); poly(methacrylamide) (PMAAm); poly(N-ethylacrylamide) (PEAAm); poly (N-ethylmethacrylamide) (PEMAAm); poly(N,N-ethylmethylacrylamide); poly(N,N-diethylacrylamide) (PDEAAm); poly(N-n-propylacrylamide) (PnPAAm); poly (N-n-propylmethacrylamide) (PnPMAAm); poly(N-isopropylacrylamide) (PNIPAM); poly(N-isopropylmethacrylamide) (PNIPMAm); poly(N-cyclopropylacrylamide) (PcPAAm); poly(N-(L)-(1-hydroxymethyl)propylmethacrylamide) (P(L-HMPMAAm)); poly(N-acryloylpyrrolidine); poly(N-acryloylpiperidine) (PAOPip); poly(N-vinyl caprolactam) (PVCL); poly(N-vinyl propylacetamide); poly(N-vinyl-5-methyl-2-oxazolidone); poly(N-vinyl isobutyramide) (PViBAm); poly(methyl 2-alkylamidoacrylate); poly (methyl 2-propionamidoacrylate); poly(methyl 2-isobutyracrylate); poly(2-substituted-2-oxazoline); poly (2-ethyl-2-oxazoline) (PEOz); poly(2-n-propyl-2-oxazoline) (PnPOz); poly(2-isopropyl-2-oxazoline) (PiPOz); poly(ethyleneoxide) (PEO); poly(ethylene glycol) (PEG) poly(propyleneoxide) (PPO); poly(propylene glycol) PPG; poly(vinylether) (PVEth); poly(methylvinylether) (PMVEth); poly (2-methoxyethylvinylether) (PMOVEth); poly(2-ethoxyethylvinylether) (PEOVEth); poly(2-(2-ethoxy) ethoxyethylvinylether); poly(4-hydroxybutylvinylether); poly(methyl glycidyl ether); poly(ethyl glycidyl ether); poly (ethoxyethyl glycidyl ether); poly(2-ethoxy-2-oxo-1,3,2-dioxaphospholane); poly(ethyl ethylene hosphate); poly(2-isopropoxy-2-oxo-1,3,2-dioxaphospholane); poly(isopropyl ethylene phosphate); poly(N-methylacrylamide) (PMAAm); poly(N,N-dimethylacrylamide) (PDMAAm); poly(N-alkyl (meth)acrylamide) bearing hydroxyl groups; poly(N-ethylmethacrylamide) (PNEMAAm); poly(N,N-ethylmethylacrylamide) (PNNEMAAm); poly(N-n-propylacrylamide) (PnPAAm); poly(N-isopropylacrylamide) (PiPAAm); poly (N-vinylisobutyramide) (PViBAm); poly(2-n-propyl-2-oxazoline) (PnPOz); poly(2-isopropyl-2-oxazoline) (PiPOz); polyleucine (PLeu); poly(vinylpyrrolidone) (PVP); poly(N-acryloylmorpholine) (pAOM); poly(N-tert-butylacrylamide); poly(2-substituted-2-oxazoline); poly(vinylalcohol) (PVA); poly(vinylacetate) (PVAc); poly(propyleneoxide) (PPO); poly[2-(2-ethoxyethoxy)ethylacrylate] (PEEO2A); poly[2-(2-methoxyethoxy)ethylmethacrylate)] (PMEO2MA); poly(2-[2-(2-methoxyethoxy)ethoxy]ethylmethacrylate) (PMEO3MA); poly[oligo(ethyleneglycol) methacrylate] (POEGMA) with side chains of eight or nine ethylene oxide units; poly(2-hydroxypropylacrylate) (PHPA); poly(2-hydroxyethylmethacrylate) (PHEMA); N-substituted polymethacrylamides with alkylaldonamide side chains; poly(amidohydroxyurethane) (PAmHU); 1,4-butanediol diglycidyl ether with triols, such as trimethylolethane and trimethylolpropane; 1,2,7,8-diepoxyoctane with ethylene glycol, di(ethylene glycol), tri(ethylene glycol), 1,2-propanediol, and glycerol; oligo(ethylene oxide)-grafted polylactides; methoxy-terminated dendronized polymethacrylates; isobutyramide-terminated poly(amidoamine) dendrimers; poly(organophosphazene with two side groups of poly(ethylene oxide) and amino acid esters; poly[6-(acryloyloxymethyl)uracil]; poly(methylvinylether) (PMVEth); poly(methacrylamide) (PMAAm); poly(N-acrylylglycinamide); and poly(N-methacrylylglycinamide). A further group of LCST polymers may be protein-based LCST polymers, such as of the structure (Poly(VPGXG), wherein V is L-valine, P is L-proline, G is glycine, and X is any natural amino acid except proline); Poly(L-proline) (PPro); Poly(N-acryloyl-L-proline methyl ester) (PAProMEs); and Poly(N-acryloyl-4-trans-hydroxy-L-proline methyl ester) (PAHProMEs).

It should be noted that not all polymers falling under the above mentioned polymer classes are LCST polymers, i.e., polymers having the above-described thermoresponsive behavior in solution. To identify a specific compound as a LCST polymer, if not already known from literature publications, its LCST behavior can be confirmed by a practical experiment with defined system parameters, and is difficult to predict. A suitable experiment to investigate a potential LCST property of a polymer is the cloud point measurement, the temperature at which a soluble compound starts coagulating in a solution and makes the solution cloudy, as also in more detail described in the experimental part of the present disclosure.

An LCST polymer which shows thermoresponsive behavior in solution may or may not have the same thermoresponsive behavior if distributed within a solid polymeric matrix, such as a dried coating. Not to be bound to theory, thermoresponsive behavior within a solid coating may depend on several factors. Non-limiting examples of such factors may be the type of polymeric matrix (second polymer) wherein the LCST polymer is distributed, the amount of LCST polymer in the coating, the thickness of the coating, the density of the coating, the humidity, or any combination of these factors.

In embodiments, the polymeric matrix in which the LCST polymer can be distributed may include an acrylic polymer, an acrylic copolymer, a styrene acrylic copolymer, a vinyl acetate polymer, a vinyl acetate ethylene copolymer, an olefin wax, a polyethylene, a polypropylene, a polyurethane, a polyester, a vinylidene chloride polymer, a styrene-butadiene copolymer an acrylonitrile-butadiene copolymer, or any combination thereof. In another particular aspect, the second polymer can be also a LCST polymer.

In certain embodiments, an amount of the LCST polymer in the WRB coating can be at least 0.5 wt %, such as at least 1 wt %, at least 5 wt %, at least 10 wt %, or at least 20 wt % based on the total weight of the coating. In other embodiments, the amount of LCST polymer in the coating may be not greater than 99 wt %, such as not greater than 90 wt %, not greater than 80 wt %, or not greater than 50 wt % based on the total weight of the coating. It will be appreciated that the amount of LCST polymer in the coating can be a value within any of the maximum and minimum values noted above, such as from 0.5 wt % to 99 wt %, from 3 wt % to 85 wt %, or from 15 wt % to 50 wt % based on the total weight of the coating.

The second polymer of the coating can be included in an amount of at least 1.0 wt % based on the total weight of the coating, such as at least 10 wt %, at least 20 wt %, at least 30 wt %, or at least 40 wt %. In other embodiments, the amount of the second polymer in the coating may be not greater than 99 wt %, such as not greater than 95 wt %, not greater than 90 wt %, not greater than 85 wt %, or not greater than 80 wt % based on the total weight of the coating. It will be appreciated that the amount of LCST polymer in the coating can be a value within any of the maximum and minimum values noted above, such as from 1.0 wt % to 99 wt %, from 5 wt % to 95 wt %, or from 35 wt % to 90 wt % based on the total weight of the coating.

In other embodiments, the coating of the WRB can further include at least one of an UV absorber, a filler, a dye, an anti-foaming agent, a viscosity modifier, a dispersant, a surfactant, or any combination thereof.

In certain embodiments, the WRB coating of the present disclosure can have a thickness of at least 10 μm, such as at least 20 μm, at least 50 μm, or at least 100 μm. In yet other embodiments the coating can have a thickness of not greater than 800 μm, such as not greater than 700 μm, not greater than 600 μm, or not greater than 500 μm. It will be appreciated that the thickness of the coating can be a value within any of the maximum and minimum values noted above, such as from 10 μm to 800 μm, from 15 μm to 650 μm, or from 20 μm to 550 μm.

The WRB of the present disclosure can be suitable for the exterior weather protection of a building substrate and can have the desired advantage that it regulates the water vapor flow, such that water vapor permeability decreases with increasing temperature in a temperature range of 5° C. to 85° C., particularly within a temperature range from 5° C. to 60° C. In certain embodiments, the water vapor permeability of the WRB coating of the present disclosure can have a decrease of at least 50% as temperature increases from 5° C. to 60° C. In other embodiments, the water vapor permeability may decrease by at least 55%, such as 60%, 70%, 80%, or 90% at a temperature increase from 5° C. to 60° C.

The decrease in water vapor permeability of a WRB coating may not be continuous over the whole temperature range, but can also occur as a certain drop in permeability, specifically close to the cloud point temperature of the LCST polymer.

In particular embodiments, the water vapor permeability of the coating at a temperature of 25° C. or below can be at least 10 US perms, such as at least 15 US perms, at least 20 US perms, at least 30 US perms, at least 50 US perms, or at least 100 US perms. In yet other embodiments, the water vapor permeability at a temperature of 45° C. or higher may not be greater than 5 US perms, such as not greater than 4 US perms, not greater than 3 US perms, not greater than 2 US perms, or not greater than 1 US perm.

The water vapor permeability of the WRB of the present disclosure can further depend on the relative humidity of its surrounding. It has been surprisingly observed that a thermoresponsive behavior of the WRB coatings can occur at high humidity, such as 75% RH or 95% RH, but not necessarily also at low humidity, such as at 25% RH. Not wishing to be bound to theory, it appears that the presence of water allows an easier conformational change of the LCST polymer in the polymeric matrix by making the matrix more hydrophilic.

The WRB coating of the present disclosure can be attached to or coated onto a building substrate to form a building assembly. As used herein, the term building substrate can be any structure suitable for the construction of buildings that would benefit from a controlled water vapor flow, specifically where it is desired having a decrease in water vapor permeability with increasing relative humidity. Non-limiting examples for building substrates can be, for example, a wall assembly, a board, a siding, a sheet good, or a panel. In a particular embodiment, the building substrate may be a board comprising gypsum.

In one embodiment, the WRB of the present disclosure can be a one-layer-coating in direct contact with at least one outer surface of a building substrate, see FIG. 2.

The present disclosure is also related to a sheet for use as a WRB. In embodiments, the sheet can be a composite of a porous substrate and the above-described coating, wherein the coating may overlie at least a first surface of the porous substrate. In particular embodiments, an adhesive layer may overlie a second opposite surface of the porous substrate and a removable liner may be attached to the adhesive layer of the sheet. In a particular embodiment, the sheet can be a self-adhered sheet for the exterior protection of a building substrate. In another particular embodiment, the sheet of the present disclosure may be formed by the coating only, for example, in form of a thin extruded film.

In embodiments, the sheet of the present disclosure can have an air permeability of less than 0.02 L/(s m$^2$) at a pressure of 75 Pa. As used herein, when referring to the air permeability, all cited air permeability values are obtained under the testing procedure as set forth in ASTM E2178 (2013).

The present disclosure is further related to a liquid coating composition suitable for making the above-described coating of the WRB. In embodiments, the liquid coating composition can include at least a first polymer and a second polymer, whereby the first polymer can include an LCST polymer. The liquid coating composition can be adapted that a solid coating formed by the liquid coating composition has an air permeability of greater than 0.02 L/(s m$^2$) at a pressure of 75 Pa.

The LCST polymer and the second polymer may be selected as described above with regard to the WRB coatings.

In embodiments, the liquid coating composition can comprise water in an amount of at least 5 wt %, such as at least 10 wt %, at least 15 wt %, or at least 20 wt % based on a total weight of the liquid coating composition. In other embodiments, the amount of water in the liquid coating composition may be not greater than 95 wt %, such as not greater than 90 wt %, not greater than 80 wt %, or not greater than 70 wt %. It will be appreciated that the water content of the liquid coating composition can be a value within any of the maximum and minimum values noted above, such as from 5 wt % to 95 wt %, from 20 wt % to 85 wt %, or from 25 wt % to 75 wt %.

In other embodiments, the liquid coating composition may contain a solvent different then water, or a mixture of water and another solvent.

In embodiments, the liquid coating composition of the present disclosure can further optionally include at least one of an UV absorber, a filler, a dye, an anti-foaming agent, a viscosity modifier, a dispersant, a surfactant, or any combination thereof.

In certain embodiments, the filler of the liquid coating composition may comprise inorganic materials, organic materials or combinations thereof. Specific fillers can include a clay, a montmorillonite, calcium carbonate, barium sulfate, a bentonite, a muscovite, an illite, a cookeite, a kaolonite, a chlorite, gypsum, silica, talc, carbon black, diatomaceous earth, alumina, titania, or combinations thereof. In some embodiments, the filler may provide reinforcement in the cured coating, may provide flame retardancy in the cured coating, or may improve the physical properties of the cured coating (e.g., decrease the coefficient of linear thermal expansion (CLTE) as compared to the CLTE of a cured composition without the filler). In certain embodiments, the filler can be present in the liquid coating composition in a range of from 0 wt % to 30 wt %, based on the total weight of the liquid coating composition.

In certain examples, the liquid coating compositions can include one or more biocidal agents. The biocidal agent can be effective to deter or prevent growth of organisms on the coating and/or surface of the building substrate. In some embodiments, the biocidal agent can be effective as a fungicide, e.g., a moldicide, to prevent growth of mold or other fungus on the surface of the substrate. In other embodiments, the biocidal agent can be effective to prevent growth of bacteria, moss, algae or other organisms on the surface of the substrate. Where present, the biocidal agent may be present in an effective amount to deter or prevent growth of bio organisms.

The liquid coating composition can also have a desirable viscosity. For example, in particular embodiments, the composition can have a viscosity of at least about 1000 cps at a shear rate of 1 s$^{-1}$ at a temperature of 21° C. In further embodiments, the composition can have a viscosity of no greater than about 1000 cps at a shear rate of 1000 s$^{-1}$ at a temperature of 21° C. Moreover, the composition can have a viscosity of at least about 5000 cps at a shear rate of 1 s$^{-1}$ at a temperature of 21° C. and a viscosity of not greater than about 1000 cps at a shear rate of 1000 s$^{-1}$ at a temperature of 21° C.

The liquid coating composition can also be described by properties after curing. As used herein, the cured liquid coating composition is referred to the coating and can be a major part of WRB or can establish the complete WRB of the present disclosure. In particular embodiments, the coating can have a particular coat weight. For example, the coating can have a coat weight of at least about 10 g/m$^2$, at least about 20 g/m$^2$, or even at least about 40 g/m$^2$. In further embodiments, the coating can have a coat weight of not greater than about 120 g/m$^2$. It will be appreciated that the coat weight can have a value within a range of any of the maximum and minimum values provided above, such as from about 10 g/m$^2$ to about 120 g/m$^2$, or from about 40 g/m$^2$ to about 100 g/m$^2$.

The present disclosure is further directed to a method for making the above-described WRB or building assembly.

In particular embodiments, the method can include providing a building substrate, and applying the above-described liquid coating composition on at least one outer surface of the building substrate. The liquid coating composition can be applied onto the building substrate, for example, by spraying, dip-coating, or coating via a Mayer rod, a brush or a blade. The applied liquid coating composition can be air dried, infrared radiation dried, or dried at elevated temperatures up to 85° C.

As demonstrated in the examples described below, it was possible to develop and produce solid barrier coatings including LCST polymers, wherein the coatings have the desired characteristic of a decrease in water vapor permeability with increasing temperature. Such behavior makes the coatings of the present disclosure suitable for use in exterior weather resistive barriers (WRB) for building assemblies. In winter, when the temperature and relative humidity within the wall cavity are high compared to the cold and dry outdoor air, the membrane can be permeable and allow moisture vapor to escape the wall cavity, while in summer, when the temperature and relative humidity levels within the wall cavity are low compared to the hot and humid outside environment, the membrane can act as a barrier and not allow the outdoor moisture to penetrate within the wall.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1

A building assembly comprising a building substrate and a weather resistive barrier (WRB), the WRB having a water vapor permeability that decreases with increasing temperature in a temperature range from 5° C. to 60° C. at 75% relative humidity (RH).

Embodiment 2

The building assembly of embodiment 1, wherein the WRB comprises a coating including a lower critical solution temperature (LCST) polymer.

Embodiment 3

The building assembly of embodiment 2, wherein the coating further comprises a second polymer different from the LCST polymer.

Embodiment 4

The building assembly or claim 1, wherein the WRB comprises a coating including a lower critical solution temperature (LCST) polymer and a second polymer different from the LCST polymer.

Embodiment 5

The building assembly of any of embodiments 2, 3, or 4, wherein the LCST polymer includes a hydroxyalkyl cellulose, a poly(alkylacrylamide), a poly(vinyl methyl ether), a polyetheramine, or any combination thereof.

Embodiment 6

The building assembly of embodiment 5, wherein the LCST polymer includes a hydroxypropylcellulose, Poly(N-isopropylacrylamide), poly(N-(tert-butyl)acrylamide), a monoamine of a poly(ethylene propylene) copolymer, or any combination thereof.

Embodiment 7

The building assembly of any of embodiments 2 to 6, wherein an amount of the LCST polymer in the coating is at least 0.5 wt % based on the total weight of the coating.

Embodiment 8

The building assembly of any of embodiments 3 to 7, wherein the second polymer includes an acrylic polymer, an acrylic copolymer, a styrene acrylic copolymer, a vinyl acetate polymer, a vinyl acetate ethylene copolymer, an olefin wax, a polyethylene, a polypropylene, a polyurethane, a polyester, a vinylidene chloride polymer, a styrene-butadiene copolymer an acrylonitrile-butadiene copolymer, or any combination thereof.

Embodiment 9

The building assembly of any of the preceding embodiments, wherein the WRB further comprises at least one of an UV absorber, a filler, a dye, an anti-foaming agent, a viscosity modifier, a dispersant, a surfactant, or any combination thereof.

Embodiment 10

The building assembly of any of the preceding embodiments, wherein the coating of the WRB has a thickness of at least 10 μm and not greater than 500 μm.

Embodiment 11

The building assembly of any of the preceding embodiments, wherein the WRB has a water vapor permeability of not greater than 5 US perms, such as not greater than 3 US perms, or not greater than 1 US perm at a temperature of at least 45° C.

Embodiment 12

The building assembly of any of the preceding embodiments, wherein the WRB has a water vapor permeability of at least 10 US perms, such as at least at least 15 US perms, at least 20 US perms, or at least 30 US perms at a temperature of less than 25° C.

Embodiment 13

The building assembly of any of embodiments 2 to 12, wherein the coating is a one-layer-coating and the coating is in direct contact with at least one outer surface of the building substrate.

Embodiment 14

The building assembly of any of the preceding embodiments, wherein the building substrate is a board, a panel, or a siding.

Embodiment 15

The building assembly of embodiment 14, wherein the building substrate is a board comprising gypsum.

Embodiment 16

The building assembly of any of the preceding embodiments, wherein the water vapor permeability of the WRB decreases by at least 50% at a temperature increase from 5° C. to 60° C.

Embodiment 17

The building assembly of any of the precedent embodiments, wherein the water vapor permeability at a temperature below 25° C. is at least 12 US perms, and the water vapor permeability at a temperature greater than 45° C. is not greater than 6 US perms.

Embodiment 18

A sheet for use as a WRB comprising a coating, wherein the coating comprises a LCST polymer and a second polymer; the sheet has an air permeability of less than 0.02 L/(s m$^2$) at a pressure of 75 Pa; and a water vapor permeability of the sheet decreases with increasing temperature in a temperature range from 5° C. to 60° C. at a relative humidity of 75% RH.

Embodiment 19

The sheet of embodiment 18, wherein the coating overlies a first surface of a porous substrate.

Embodiment 20

The sheet of embodiments 18 or 19, wherein the sheet further comprises an adhesive layer overlying a second surface of the porous substrate.

Embodiment 21

The sheet of embodiment 20, wherein the sheet comprises a removable liner attached to the adhesive layer.

Embodiment 22

The sheet of any of embodiments 18 to 20, wherein the sheet is an self-adhered sheet.

Embodiment 23

The sheet of embodiment 18, wherein the sheet is an extruded film.

Embodiment 24

The sheet of any of embodiments 18 to 23, wherein the LCST polymer comprises a hydro alkyl cellulose, a poly (alkylacrylamide), a poly(vinyl methyl ether), a polyetheramine, or any combination thereof.

Embodiment 25

The sheet of embodiment 24, wherein the LCST polymer includes hydroxypropylcellulose, poly(N-isopropylacrylamide), poly(N-(tert-butyl)acrylamide), a monoamine of a poly (ethylene propylene) copolymer, or any combination thereof.

Embodiment 26

The sheet of any of embodiments 18 to 25, wherein the sheet has a water vapor permeability of not greater than 5 US perms, such as not greater than 3 US perms, or not greater than 1 US perm at a temperature of at least 45° C.

Embodiment 27

The sheet of any of embodiments 18 to 25, wherein the sheet has a water vapor permeability of at least 10 US perms, such as at least at least 20 US perms, at least 30 US perms, or at least 40 US perms at a temperature of less than 25° C.

Embodiment 28

The sheet of any of embodiments 18 to 27, wherein the water vapor permeability of the WRB decreases by at least 50% at a temperature increase from 5° C. to 60° C.

Embodiment 29

The sheet of any of embodiments 18 to 25 or 28, wherein the water vapor permeability at a temperature below 25° C. is at least 12 US perms, and the water vapor permeability at a temperature greater than 45° C. is not greater than 6 US perms.

Embodiment 30

A method for making a building component, comprising: providing a building substrate; and attaching a WRB to at least one outer surface of the building substrate, wherein the WRB comprises a coating including a LCST polymer and a second polymer.

Embodiment 31

The method of embodiment 30, comprising: preparing an aqueous coating solution comprising the LCST polymer and the second polymer; applying the aqueous coating solution onto at least one outer surface of the building substrate; and drying the aqueous coating solution to form the coating.

Embodiment 32

The method of embodiments 30 or 31, wherein the building substrate is a board, panel, or siding.

Embodiment 33

The method of embodiment 32, wherein the building substrate is a board comprising gypsum.

Embodiment 34

The method of any of embodiments 30 to 33, wherein the WRB has a water vapor permeability that decreases with increasing temperature in a temperature range of 5° C. to 85° C., such as 5° C. to 75° C., or 5° C. to 60° C.

Embodiment 35

The method of any of embodiments 30 to 34, wherein the WRB has a water vapor permeability not greater than 5 US perms, such as not greater than 3 US perms, or not greater than 1 US perm at a temperature of at least 45° C.

Embodiment 36

The method of any of embodiments 30 to 35, wherein the WRB has a water vapor permeability of at least 10 US perms, such as at least at least 20 US perms, at least 30 US perms, or at least 40 US perms at a temperature of less than 25° C.

Embodiment 37

A liquid coating composition comprising a first polymer and a second polymer, wherein the first polymer comprises a LCST polymer, and wherein the liquid coating composition is adapted that a solid coating formed by the liquid coating composition has an air permeability of less than 0.02 L/(s m$^2$) at a pressure of 75 Pa, and a water vapor permeability of the solid coating decreases with increasing temperature in a temperature range from 5° C. to 60° C. at a relative humidity of 75% RH.

Embodiment 38

The liquid coating composition of embodiment 37, wherein the coating composition comprises water in an amount of at least 5 wt %.

Embodiment 39

The liquid coating composition of embodiments 37 or 38, wherein the LCST polymer includes a hydroxyalkyl cellulose, a poly(alkylacrylamide), a poly(vinyl methyl ether), a polyetheramine, or any combination thereof.

Embodiment 40

The liquid coating composition of embodiment 39, wherein the LCST polymer includes hydroxypropylcellulose, poly(N-isopropylacrylamide), poly(N-(tert-butyl)acrylamide), a monoamine of a poly(ethylene propylene) copolymer, or any combination thereof.

Embodiment 41

The liquid coating composition of any of embodiments 37 to 40, wherein the second polymer is an emulsion polymer.

Embodiment 42

The liquid coating composition of any of embodiments 37 to 41, wherein the second polymer includes an acrylic polymer, a acrylic copolymer, a styrene acrylic copolymer, a vinyl acetate polymer, a vinyl acetate ethylene copolymer, an olefin wax, a polyurethane, a vinylidene chloride polymer, a styrene-butadiene copolymer, an acrylonitrile-butadiene copolymer, or any combination thereof.

EXAMPLES

The following non-limiting examples illustrate the concepts as described herein.

Example 1

The cloud points of two different LCST polymers, hydroxypropyl cellulose (HPC) and Poly(N-isopropylacrylamide) (PNIPAAM), were tested in aqueous solutions at varying concentrations. The cloud point is related to the temperature of a thermoresponsive polymer at which the dissolved polymer starts to coagulate and to separate from the solution, thereby causing a cloudiness of the solution. The cloud point can be an indication of the LCST of an investigated thermoresponsive polymer.

The cloud tests were started at an initial temperature of 25° C., and the temperature of the polymer solutions was slowly increased at a speed of about 2° C. every five minutes. The tests were also conducted in the reverse direction to determine the clearing point at which the coagulated polymer dissolves again. The decrease in temperature was regulated also at a speed of 2° C. every five minutes. For the test evaluation, the temperatures at which the clouding and clearing began was noted, as well as the temperature at which the solutions were fully clouded or fully cleared.

A summary of the cloud test results is shown in Table 1 for PNIPAAM and in Table 2 for HPC. It can be seen that PNIPAAM has a cloud point in the range of 31° C. to 33° C., while HPC has a cloud point in the range of 46° C. to 48° C. Both materials showed a reversible clouding effect, whereby the temperature of the clearing point was slightly lower than the temperature of the clouding point. Different concentrations did not lead to a change in the clouding point temperature.

TABLE 1

Cloud test results of PNIPAAM solutions with varying concentrations.

| PNIPAAM Concentration | Clouding Point (heating of solution) | | Clearing Point (cooling of solution) | |
|---|---|---|---|---|
| | Initial Clouding Point [° C.] | Final Clouding Point [° C.] | Initial Clearing Point [° C.] | Final Clearing Point [° C.] |
| .5% | 33.5 | 35.2 | 33.5 | 31.1 |
| 1% | 33.1 | 34.3 | 33.2 | 32.1 |
| 5% | 33.4 | 33.7 | 33 | 31.1 |
| 10% | 32.6 | 33.3 | 32.9 | 31.1 |

TABLE 2

Cloud test results of HPC solutions with varying concentrations.

| HPC Concentration | Clouding Point (heating of solution) | | Clearing Point (cooling of solution) | |
|---|---|---|---|---|
| | Initial Clouding Point [° C.] | Final Clouding Point [° C.] | Initial Clearing Point [° C.] | Final Clearing Point [° C.] |
| .5% | 49.4 | 52.6 | 50.8 | 47.6 |
| 1% | 48 | 57.4 | 48.6 | 47.3 |
| 5% | 46.5 | 47.9 | 47.1 | 46.5 |
| 10% | 48.4 | 48.9 | 48.3 | 46 |

Example 2

Permeability testing of LCST polymer coatings (100% LCST polymer in dry coating) at varying temperature:

Three aqueous liquid coating solutions were prepared, each including one of the following LCST polymers: 1) poly[2-(2-ethoxyethoxy)ethylacrylate] (PEEO2A from Aldrich); 2) polyvinylalcohol (PVA LM25 from Kuraray); and 3) a polyurethane made of polypropylene glycol (PPG4000) and isocyanate (Desmodur N75MPA).

The liquid coating solutions were applied via a Mayer rod on an uncoated brown Kraft paper (80 g/m²) and allowed to dry. The resulting dry coating thicknesses for all samples were 100 μm, and contained 100 wt % of the LCST polymer based on the total weight of the coating.

The dried samples were analyzed with regard to their water vapor permeability at 75% RH, at five different temperatures: 10° C.; 20° C.; 30° C.; 40° C.; and 50° C.

Figure 3:
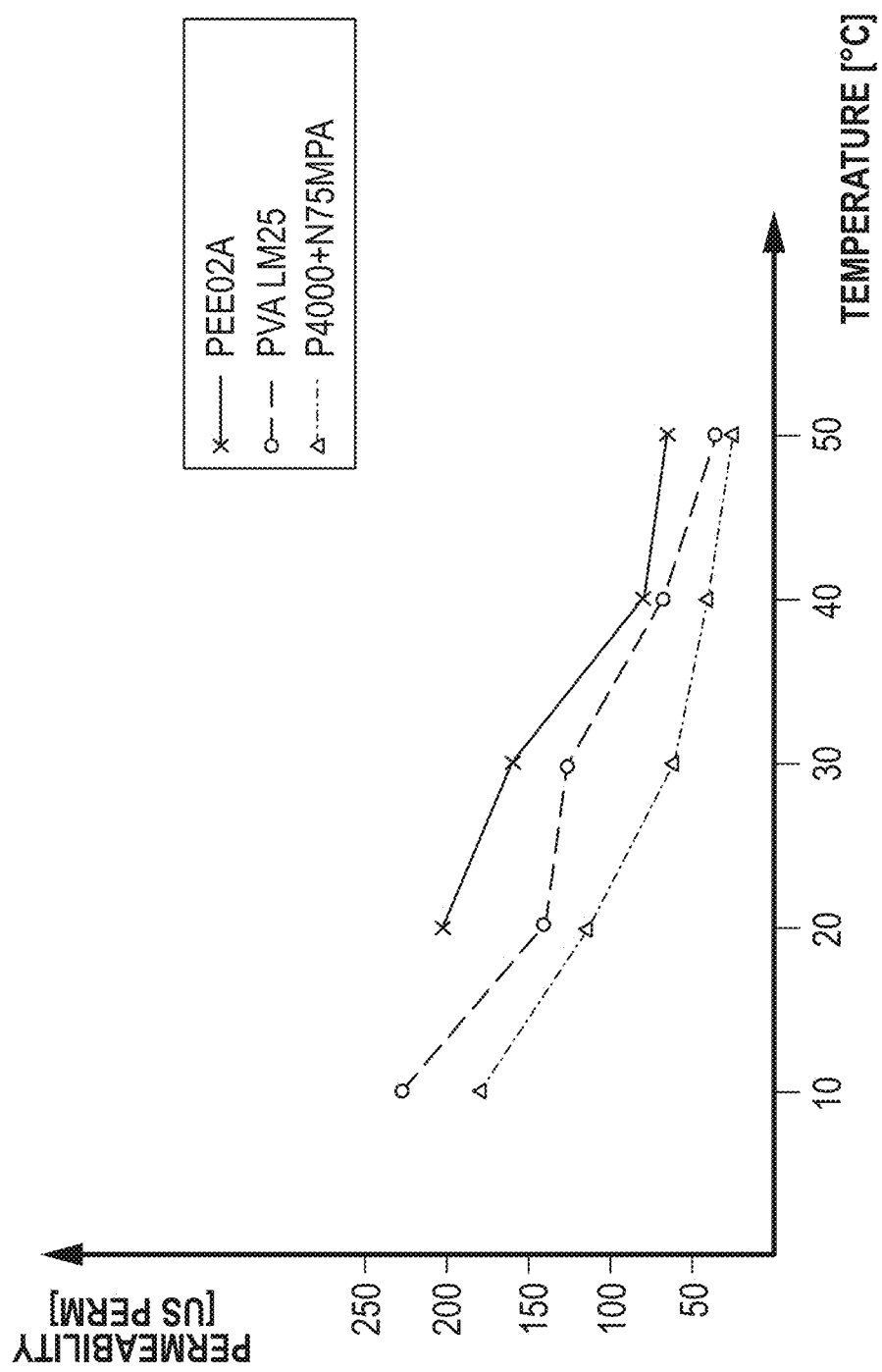
FIG. 3 is a graph showing the water vapor permeability of three different LCST polymer coatings (100 wt % LCST polymer in the dry coating) at varying temperature and 75% RH according to certain embodiments.

A summary of the prepared coating samples and the measured water vapor permeability values can be seen in Table 3 and FIG. 3. For all LCST polymer coating layers, a decrease in water vapor permeability with increasing temperature could be observed over the tested temperature range.

MB-364, a full acrylic polymer (from Dow Chemical Company). The coatings varied in the amount of LCST polymer, the amount of matrix polymer and the thickness of the dry coatings (see Table 5). Permeability measurements were conducted at 25% RH and 75% RH and at two different temperatures: 20° C. and 60° C.

TABLE 3

| Sample | LCST Polymer | LCST in dry coating [%] | Thickness of dry coating [μm] | Permeability [US Perm] | | | | |
|---|---|---|---|---|---|---|---|---|
| | | | | 10° C. | 20° C. | 30° C. | 40° C. | 50° C. |
| E1 | PEEO2A | 100 | 100 | | 207.2 | 162.2 | 80.15 | 67.2 |
| E1 | PVA LM25 | 100 | 100 | 227.8 | 142.6 | 128.7 | 72.3 | 37.6 |
| E3 | Polyurethane of PG4000 + N75MPA | 100 | 100 | 177.7 | 116.4 | 63.2 | 45 | 27.5 |

Example 3

Figure 4:
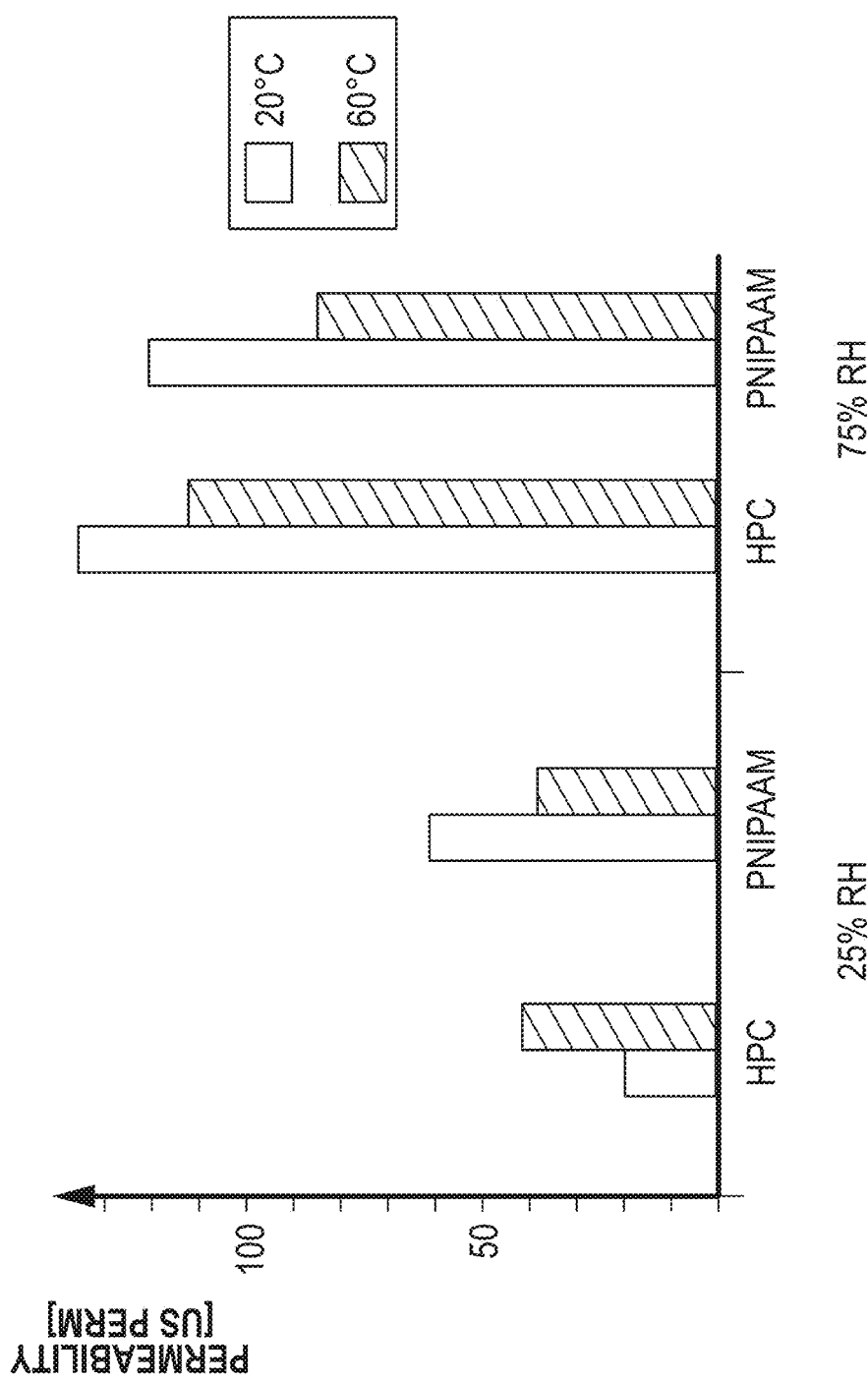
FIG. 4 is a graph showing the water vapor permeability of two different LCST polymer coatings (100 wt % LCST polymer in the dry coating) at 25% RH and 75% RH and varying temperature according to certain embodiments.

Permeability testing of LCST polymer coatings (100% LCST polymer in dry coating) at varying temperature and at two different humidities:

Coated paper samples have been prepared according to the same procedure as described in Example 2, except that as LCST polymers were used hydroxypropyl cellulose (HPC) from Fisher Scientific, and Poly(N-isopropylacrylamide) (PNIPAAM) from Sigma Aldrich. Water vapor permeability were measured at two different humidities, such as 25% RH and 75% RH. For each humidity, two different temperatures were chosen for the permeability measurements: 20° C. and 60° C. As can be seen in Table 4 and FIG. 4, the PNIPAAM layer showed a decrease in water vapor permeability at increasing temperature for both humidity conditions, at 25% RH and 75% RH. In the case of the HPC layer, a decrease in water vapor permeability was observed at 75% RH, but not at 25% RH.

For HPC, a typical LCST effect in the polymeric matrix XU31591 was observed at a concentration of 23 wt %, while lower concentrations (1 and 5 wt %) did not result in such temperature related behavior. In contrast, PNIPAAM showed at all tested concentrations a LCST effect, at 1 wt %, 5 wt %, and 23 wt % in polymeric matrix XU31591.

Figure 5:
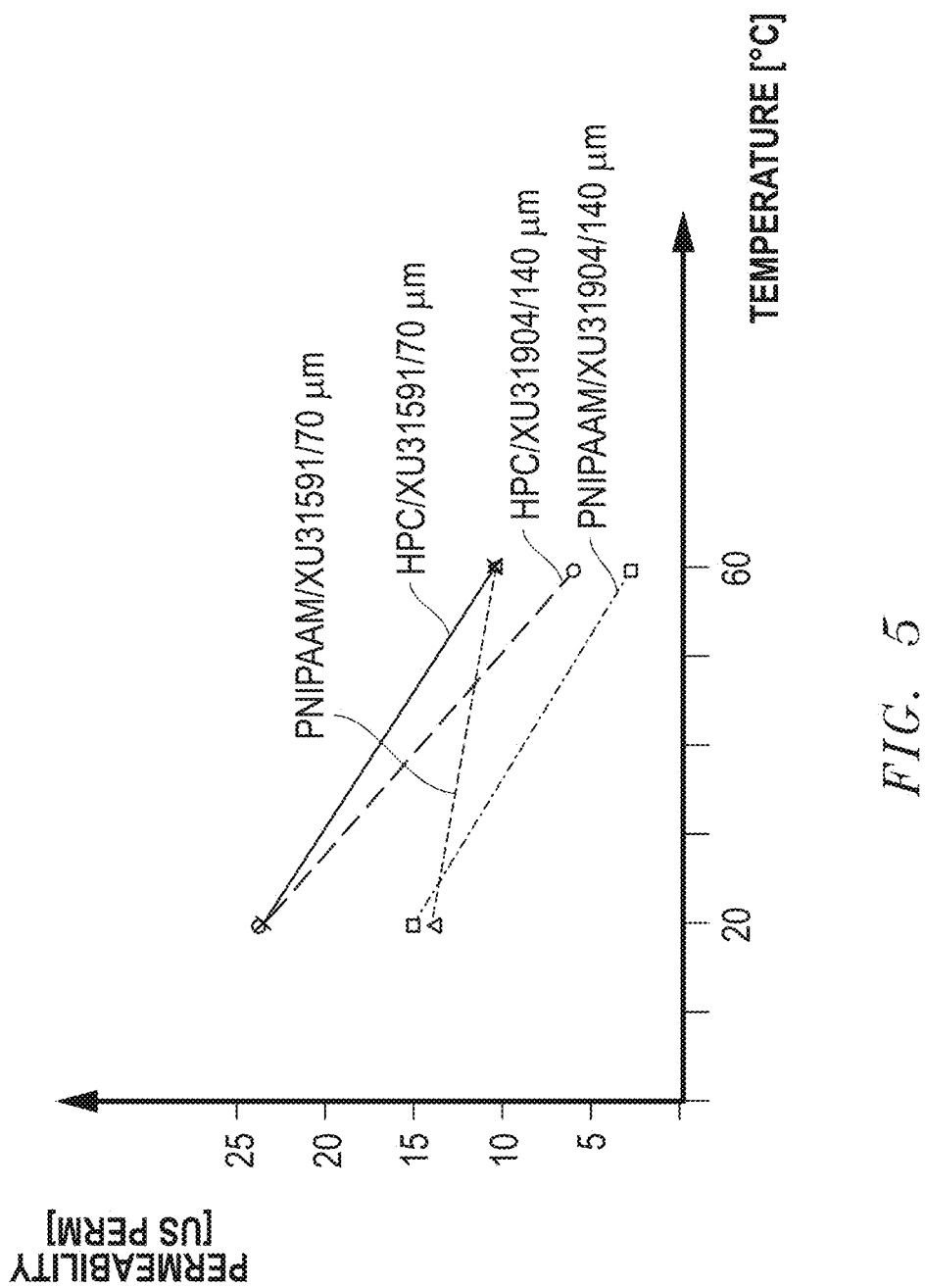
FIG. 5 is a graph showing the water vapor permeability of two different LCST polymer coatings, wherein the LCST polymer is distributed in a polymeric matrix (23 wt % LCST polymer in the dry coating) at varying temperature and 75% RH according to certain embodiments.

The lowest water vapor permeability values at high temperature (60° C.) was observed with Latex XU31904 at a coating thickness of 140 μm. This combination also had the strongest decrease in water vapor permeability with increasing temperature (20° C. to 60° C.). See FIG. 5.

The use of Lipacryl MB-304 resulted in a decrease of the activity of the tested LCST polymers compared to XU31591 and XU31904. PNIPAAM only showed a LCST effect at 20 wt % in the coating, but not at a lower concentration of 5 wt %, while HPC did not show a LCST behavior at any of tested concentrations (5 and 20 wt %) in Lipacryl MB-304.

TABLE 4

| Sample | LCST Polymer | LCST [wt %] | Thickness of dry coating [μm] | Permeability [US Perm] | | | |
|---|---|---|---|---|---|---|---|
| | | | | 25% RH | | 75% RH | |
| | | | | 20° C. | 60° C. | 20° C. | 60° C. |
| E4 | HPC | 100 | 31 | 29.3 | 40.8 | 145 | 111 |
| E5 | PNIPAAM | 100 | 31 | 62.2 | 35.9 | 120.4 | 84.3 |

Example 4

Permeability testing of coatings with LCST polymer contained in a polymeric matrix: Solid coatings were prepared with LCST polymers HPC or PNIPAAM contained in a polymeric matrix. As matrix polymers (second polymer) were used Latex XU31591, a styrene butadiene based polymer (from Trinseo); Latex XU31904, a butadiene-vinylidene chloride based polymer (from Trinseo), and Lipacryl For all three tested matrix polymers combined with HPC or PNIPAAM, LCST behavior was only observed at 75% RH, and not at 25% RH.

The results demonstrate that a desired thermoresponsive behavior of a LCST polymer in a polymeric matrix depends on several factors, such as the amount of LCST in the coating, the type of the polymeric matrix in which the LCST polymer is distributed, the thickness of the coatings, and the relative humidity.

TABLE 5

| Exp. | LCST | LCST [wt %] | Latex [wt %] | Latex | Dry coating Thickness [μm] | Permeability [US Perm] 25% RH | | 75% RH | |
|---|---|---|---|---|---|---|---|---|---|
| | | | | | | 20° C. | 60° C. | 20° C. | 60° C. |
| E6 | HPC | 1 | 99 | Latex XU31591 | 82 | 2.5 | 2.6 | 3.3 | 3.5 |
| E7 | PNIPAAM | 1 | 99 | Latex XU31591 | 82 | 3.3 | 3.2 | 8.0 | 5.3 |
| E8 | HPC | 5 | 95 | Latex XU31591 | 78 | 2.0 | 3.5 | 2.8 | 3.6 |
| E9 | PNIPAAM | 5 | 95 | Latex XU31591 | 78 | 4.0 | 6.5 | 8.6 | 6.9 |
| E10 | HPC | 23 | 77 | Latex XU31591 | 70 | 4.4 | 5.6 | 23.1 | 10.3 |
| E11 | PNIPAAM | 23 | 77 | Latex XU31591 | 70 | 5.7 | 5.9 | 14.3 | 10.6 |
| E12 | HPC | 23 | 77 | Latex XU31904 | 140 | 0.85 | 1.4 | 23 | 5.8 |
| E13 | PNIPAAM | 23 | 77 | Latex XU31904 | 140 | 1.1 | 1.6 | 15.2 | 2.8 |
| E14 | HPC | 5 | 95 | Lipacryl MB-3041 | 73 | 7.9 | 8.8 | 9.9 | 14.9 |
| E15 | PNIPAAM | 5 | 95 | Lipacryl MB-304 | 73 | 7.4 | 9.1 | 11.5 | 14.4 |
| E16 | HPC | 20 | 80 | Lipacryl MB-304 | 67 | 8.8 | 9.8 | 18.9 | 18.9 |
| E17 | PNIPAAM | 20 | 80 | Lipacryl MB-304 | 67 | 20.9 | 16.1 | 39.2 | 34.0 |
| E18 | | 0 | 100 | Latex XU31591 | 77 | 4.7 | 4.3 | 8.5 | 8.6 |
| E19 | | | 100 | Latex XU31904 | 77 | 0.7 | 1.4 | 1.9 | 3.6 |
| E20 | | 0 | 100 | Lipacryl MB-304 | 74 | 8.2 | 8.5 | 8.3 | 9.3 |

Example 5

LCST Polymer Grafted on Cross-Linked Polyurethane

A liquid coating composition was prepared mixing together at room temperature 50 wt % ethyl acetate (solvent), 2.5 wt % ethylene glycol; 31.5 wt % Desmodur N75MPA (an isocyanate from Covestro), and 16 wt % Jeffamine M2005™-brand LCST polymer. Coated paper samples have been prepared according to the same procedure as described in Example 2. The water vapor permeability was measured for the dried samples at 75% RH and varying temperatures in a range from 20° C. to 50° C. It can be seen in Table 6 that the water vapor permeability decreased with increasing temperatures in the tested range of 20° C. to 40° C., and appeared to reach a plateau at 40° C. Not to be bound by theory, the results indicate that also if the LCST polymer is chemically bound to a matrix polymer (in the present example to a polyurethane), the LCST polymer can provide a LCST effect, i.e., decreasing the water vapor permeability with increasing temperature.

Measurement of the Water Vapor Permeability at Different Temperatures and Different Humidities The water vapor permeability at 25% RH and 75% RH of all coated paper samples have been measured according to ASTM E96 (2014), also called the cup test method.

The testing chamber was first set to 20° C. and 50% RH. This allowed the measurement of water vapor permeability values below the LCST at both 25% RH and 75% RH based on the dry and wet cup, respectively. Data points (cup weights) were measured every 1-2 hours. Because saturation of the dry cups may occur within 24 hours, at least six data points had to be taken within the 24 hour time frame. Once enough data points at 20° C. were obtained, the chamber was set to 60° C. and 50% RH. This allowed the determination of permeability values above the LCST at both 25% RH and 75% RH. At the higher temperature, data points were taken every 30-45 minutes, because saturation of the dry cups may occur within 5-6 hours, and at least six data points should be taken within this time frame.

All measured permeability values are average values of two independent coating samples.

TABLE 6

| Sample | LCST Polymer/ Matrix | LCST in dry coating [wt %] | Thickness of dry coating [μm] | Permeability [US Perm] | | | | |
|---|---|---|---|---|---|---|---|---|
| | | | | 10° C. | 20° C. | 30° C. | 40° C. | 50° C. |
| E1 | Jeffamine ™/ grafted on Polyurethane | 10 | 100 | | 28.5 | 14.6 | 10.0 | 10.3 |

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention.

What is claimed is:

1. A building assembly comprising a building substrate and a weather resistive barrier (WRB), the WRB having a water vapor permeability that decreases with increasing temperature in a temperature range from 5° C. to 60° C. at 25% relative humidity (RH).

2. The building assembly of claim 1, wherein the WRB comprises a coating including a lower critical solution temperature (LCST) polymer.

3. The building assembly of claim 2, wherein the coating further comprises a second polymer different from the LCST polymer.

4. The building assembly of claim 2, wherein the LCST polymer includes a hydroxyalkyl cellulose, a poly(alkylacrylamide), a poly(vinyl methyl ether), a polyetheramine, or any combination thereof.

5. The building assembly of claim 4, wherein the LCST polymer includes a hydroxypropylcellulose, Poly(N-isopropylacrylamide), poly(N-(tert-butyl)acrylamide), a monoamine of a poly(ethylene propylene) copolymer, or any combination thereof.

6. The building assembly of claim 2, wherein an amount of the LCST polymer in the coating is at least 0.5 wt % based on the total weight of the coating.

7. The building assembly of claim 3, wherein the second polymer includes an acrylic polymer, an acrylic copolymer, a styrene acrylic copolymer, a vinyl acetate polymer, a vinyl acetate ethylene copolymer, an olefin wax, a polyethylene, a polypropylene, a polyurethane, a polyester, a vinylidene chloride polymer, a butadiene-vinylidene chloride copolymer, a styrene-butadiene copolymer, an acrylonitrile-butadiene copolymer, or any combination thereof.

8. The building assembly of claim 2, wherein the WRB further comprises at least one of an UV absorber, a filler, a dye, an anti-foaming agent, a viscosity modifier, a dispersant, a surfactant, or any combination thereof.

9. The building assembly of claim 2, wherein the coating of the WRB has a thickness of at least 10 μm and not greater than 500 μm.

10. The building assembly of claim 1, wherein the water vapor permeability of the WRB has a decrease of at least 50% at a temperature increase from 5° C. to 60° C.

11. The building assembly of claim 1, wherein the water vapor permeability of the WRB at a temperature of 25° C. or below is at least 12 US perms, and a water vapor permeability at a temperature of 45° C. or greater is not greater than 6 US perms.

12. The building assembly of claim 2, wherein the coating is a one-layer-coating and the coating is in direct contact with at least one outer surface of the building substrate.

13. The building assembly of claim 12, wherein the building substrate is a board, a panel, or a siding.

14. The building assembly of claim 13, wherein the building substrate is a board comprising gypsum.

15. A sheet for use as a WRB comprising a coating, wherein the coating comprises a LCST polymer and a second polymer; the sheet has an air permeability of less than 0.02 L/(s m$^2$) at a pressure of 75 Pa; and a water vapor permeability of the sheet decreases with increasing temperature in a temperature range from 5° C. to 60° C.

16. The sheet of claim 15, wherein the sheet comprises a porous substrate, and the coating overlies a first surface of the porous substrate.

17. The sheet of claim 15, wherein the water vapor permeability of the sheet has a decrease of at least 50% at a temperature increase from 5° C. to 60° C.

18. The sheet of claim 15, wherein the sheet further comprises an adhesive layer and is a self-adhered sheet.

19. The sheet of claim 15, wherein the second polymer includes an acrylic polymer, an acrylic copolymer, a styrene acrylic copolymer, a vinyl acetate polymer, a vinyl acetate ethylene copolymer, an olefin wax, a polyethylene, a polypropylene, a polyurethane, a polyester, a vinylidene chloride polymer, a butadiene-vinylidene chloride copolymer, a styrene-butadiene copolymer, an acrylonitrile-butadiene copolymer, or any combination thereof.

20. The sheet of claim 15, wherein the LCST polymer includes Poly(N-isopropylacrylamide) and the second polymer includes butadiene-vinylidene chloride.

21. A liquid coating composition comprising at least one LCST polymer and at least one second polymer, wherein a solid coating formed by the liquid coating composition has an air permeability of less than 0.02 L/(s m$^2$) at a pressure of 75 Pa; and a water vapor permeability of the solid coating decreases with increasing temperature in a temperature range from 5° C. to 60° C.

22. The liquid coating composition of claim 21, wherein the LCST polymer includes a hydroxyalkyl cellulose, a poly(alkylacrylamide), a poly(vinyl methyl ether), a polyetheramine, or any combination thereof.

23. The liquid coating composition of claim 21, wherein the second polymer includes an acrylic polymer, an acrylic copolymer, a styrene acrylic copolymer, a vinyl acetate polymer, a vinyl acetate ethylene copolymer, an olefin wax, a polyethylene, a polypropylene, a polyurethane, a polyester, a vinylidene chloride polymer, a butadiene-vinylidene chloride copolymer, a styrene-butadiene copolymer, an acrylonitrile-butadiene copolymer, or any combination thereof.

24. The liquid coating composition of claim 21, wherein the LCST polymer includes Poly(N-isopropylacrylamide) and the second polymer includes butadiene-vinylidene chloride.

* * * * *